United States Patent
Villalobos et al.

(10) Patent No.: US 7,449,238 B1
(45) Date of Patent: Nov. 11, 2008

(54) LIF-COATED DOPED AND UNDOPED YTTRIUM OXIDE

(75) Inventors: Guillermo R. Villalobos, Springfield, VA (US); Jasbinder S. Sanghera, Ashburn, VA (US); Shyam Bayya, Ashburn, VA (US); Ishwar D. Aggarwal, Fairfax Station, VA (US); Woohong Kim, Lorton, VA (US); Bryan Sadowski, College Park, MD (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/861,498

(22) Filed: Sep. 26, 2007

(51) Int. Cl.
*B32B 5/16* (2006.01)

(52) U.S. Cl. ........................ 428/403; 428/404; 428/405; 428/406; 428/407; 501/94

(58) Field of Classification Search ................. 428/403, 428/404, 405, 406, 407; 501/94
See application file for complete search history.

(56) References Cited

U.S. PATENT DOCUMENTS

| | | | | |
|---|---|---|---|---|
| 4,134,777 A | * | 1/1979 | Borom | 134/2 |
| 4,837,187 A | * | 6/1989 | Frank et al. | 501/127 |
| 5,401,309 A | * | 3/1995 | Chopin et al. | 106/461 |
| 5,409,871 A | * | 4/1995 | Dodds et al. | 501/127 |
| 5,580,837 A | * | 12/1996 | Dodds et al. | 501/152 |
| 6,080,485 A | * | 6/2000 | Wataya | 428/403 |
| 7,211,325 B2 | * | 5/2007 | Villalobos et al. | 428/403 |

* cited by examiner

*Primary Examiner*—Kiliman Leszek
(74) *Attorney, Agent, or Firm*—John J. Karasek; Suresh Koshy

(57) ABSTRACT

An embodiment of the invention includes a particle. The particle includes a first yttria core; and a fluoride salt coating on the first yttria core. The coating is sufficiently continuous to prevent a large number of sites where a second yttria core may come into contact with the first yttria core. Optionally, the particle has been heated in an oxidizing atmosphere to a temperature in the range of about 400° C. to about 750° C. Optionally, the particle is substantially free of at least one of carbon-containing species and water. Optionally, the fluoride salt is lithium fluoride. Optionally, the fluoride salt is aluminum fluoride.

9 Claims, 2 Drawing Sheets

US 7,449,238 B1

LIF-COATED DOPED AND UNDOPED YTTRIUM OXIDE

FIELD OF THE INVENTION

Figure 1:
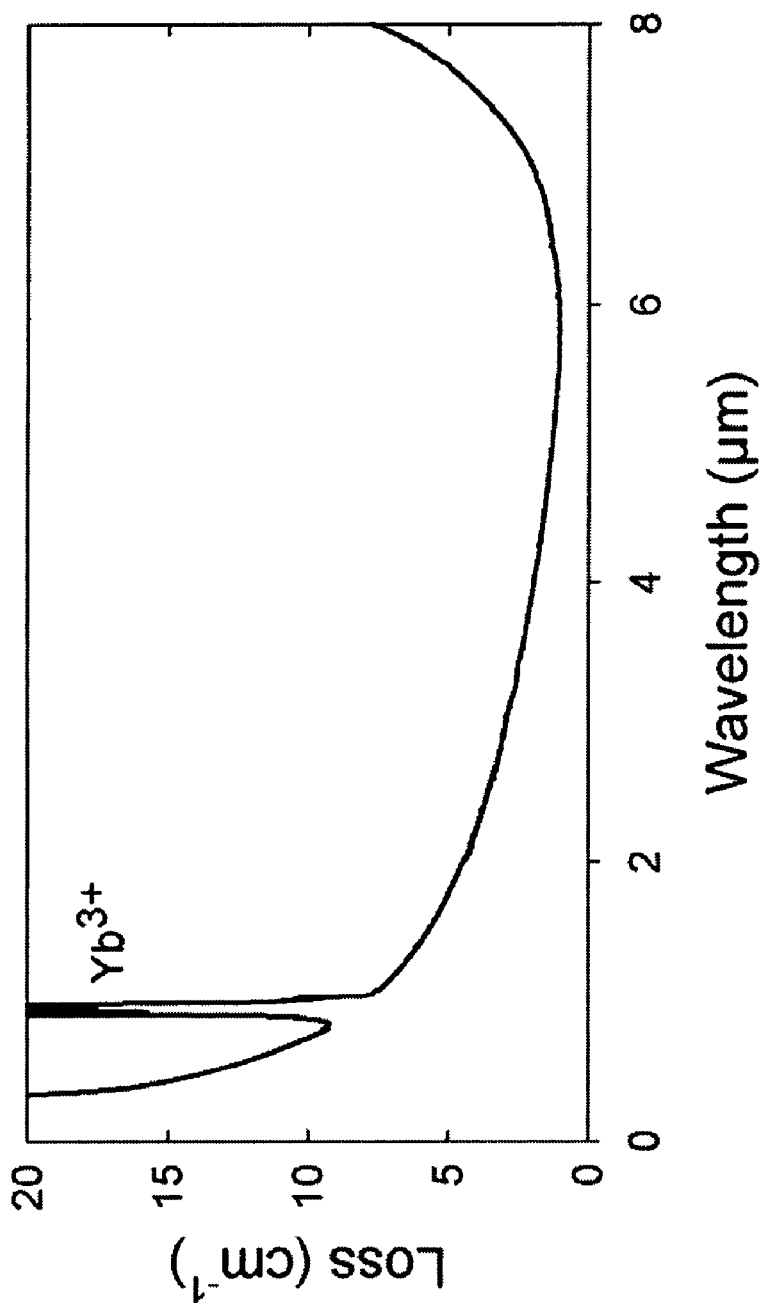

The invention is related to LiF-coated Yttrium oxide powders both doped and undoped.

DESCRIPTION OF THE RELATED ART

Dense yttrium oxide ($Y_2O_3$ or yttria) is hard, strong, possesses high thermal conductivity and is transparent from about 0.3-8 μm. Undoped yttria is useful as long wave infra red window, while rare earth doped yttria is useful as a high power laser material. Doping is the process of incorporating other atoms, in this case rare earth atoms (e.g. Yb, Nd, Er, etc.), into an otherwise pure matrix. Whereas most laser crystals are, as the name would imply, single crystals, coated powders are suitable for making polycrystalline material that behave as though they were single crystals. In this case, the coating is defined as being sufficiently adherent to the material and of such size and thickness as to prevent individual yttria surfaces form touching each other even after handling or submersing in a liquid or gas stream. From hereon, yttria will refer to both doped and undoped material unless otherwise indicated.

Traditional processing of polycrystalline yttria leads to high scattering and absorption losses that are distributed in localized yet random regions thus making the material unsuitable as either a laser material or a window. Basically, the article does not posses uniform optical losses, and consequently the yield is poor, costs are high and large size and different shapes are not possible to manufacture. The scattering sites are typified by voids or inclusions that appear white when viewed in reflected light. The absorbing regions are dark when viewed in both transmitted and reflected light.

LiF is a common sintering aid and can be made to function as one with yttria powder. LiF sintering aid does not react with the yttria matrix. However, other reactions can contribute to optical scattering. The common reactions that contribute to optical scattering are, for example, the formation of oxygen vacancies, and the formation of transition metal compounds that resulted from impurities in the starting yttria powder and sintering aid. A by-product of this is the presence of voids that possess very high scattering efficiencies. The dark absorbing regions are mainly due to substoichiometric yttria (e.g., due to oxygen vacancies), hydrocarbons that cracked during the sintering operation, carbon that diffused into the yttria from the furnace/die/die-liner environment, or carbon present in the starting powders. In addition, they can also be due to the presence of reduced state transition metal ions and silicon. This could also be due to planar precipitates which also scatter light.

Sintering, both pressure-less and with pressure (e.g., hot pressing), requires a vast amount of material transport to consolidate an aggregate of loose powder particles into a dense shape. In the case of porcelains and clay products, secondary phases do melt and "glue" the primary solid particles together with a glassy phase. These types of systems were the first to be used due to their ease of sintering. However, advanced ceramics do not have these intrinsic sintering aids and must therefore be added. For small samples, the powdered sintering aids are mixed with the powder to be sintered using a mortar and pestle. In larger samples, mixing is accomplished by ball milling, attritor milling, high shear wet milling, and/or variations or combinations of these methods. However, due to the nature of particle-particle interactions, the mixture is far from homogeneous. In the case of optical or laser quality polycrystalline materials, homogeneity must be measured on the nanometer scale. Mechanical mixing results in homogeneity that is only in the hundreds of microns range. That level of homogeneity is several orders of magnitude too high to produce optical or laser quality polycrystalline material. Inhomogeneity, for example, results in areas that have too much sintering aid and other areas that have little or no sintering aid. While this is generally not too important in systems that are relatively easy to sinter or are not needed to be highly transparent, it is a major problem in the fabrication of transparent ceramics and laser quality polycrystalline materials. It leads to materials that are inhomogeneous and contain regions of opacity. This adds a tremendous amount of cost to the product since yields are low, and size is limited to small regions core drilled out of the large sample.

SUMMARY OF THE INVENTION

An embodiment of the invention includes a particle. The particle includes a first yttria core; and a fluoride salt coating on the first yttria core. The coating is sufficiently continuous to prevent a large number of sites where a second yttria core may come into contact with the first yttria core. Optionally, the particle has been heated in an oxidizing atmosphere to a temperature in the range of about 400° C. to about 750° C. Optionally, the particle is substantially free of at least one of carbon-containing species and water. Optionally, the fluoride salt is lithium fluoride. Optionally, the fluoride salt is aluminum fluoride.

Optionally, the particle is made by a process including mixing the yttria core with a solution of the fluoride salt in a solvent to form a slurry; and spraying the slurry into a drying column. The slurry enters the drying column as an aerosol under thermal conditions that avoid boiling the solvent. Thermal conditions in the drying column evaporate the solvent as the aerosol moves through the drying column to form a coating of the fluoride salt on the yttria core while substantially avoiding spalling.

Optionally, the yttria core has a diameter of from about 10 nanometers to about 100 microns; and wherein the coating has a thickness of from about 1 nanometer to about 500 microns. Optionally, the yttria core has a diameter of from about 100 nanometers to about 30 microns; and wherein the coating has a thickness of from about 10 nanometers to about 200 microns.

Optionally, the particle is made by a process including heating the particle in an oxidizing atmosphere to a temperature in the range of about 550° C. to about 650° C. to such that the resulting particle is substantially free of carbon-containing species.

BRIEF DESCRIPTION OF THE DRAWINGS

FIG. 1 shows a bulk loss plot of a prior art Yb doped yttria.

FIG. 2 shows an illustrative bulk loss plot of the Yb doped yttria of Example 4.

DESCRIPTION OF THE PREFERRED EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail. U.S. patent application Ser. No. 11/268,401 to Villalobos et al., entitled "MAGNESIUM ALUMINATE TRANSPARENT CERAMIC HAVING LOW SCATTERING AND ABSORPTION LOSS," is incorporated herein by reference. U.S. Pat. No. 7,211,325 to Villalobos et al., entitled "FLUORIDE SALT COATED Mg ALUMINATE PARTICLE," is incorporated herein by reference.

The invention generally pertains to LiF coated yttria particles and agglomerates which make up a powder. The LiF coating allows for uniform sintering, reduced porosity, and a decrease in exaggerated grain growth. The coating need not be hermetic or continuous, but is sufficient to prevent a large number of sties where the particles contact each other without an intervening layer of LiF material. The coating is also sufficiently adherent to prevent its separation from the individual particles if the coated powder is immersed in a liquid or subjected to a gas stream. The LiF coated yttria particles and agglomerates optionally allows the manufacture of a dense, highly transparent, polycrystalline yttria ceramic product.

The scattering sites are optionally reduced or eliminated by homogeneously distributing (e.g., on a nanometer scale) the sintering aid as a coating on the starting yttria powder particles and agglomerates. This optionally allows a reduction in the total amount of sintering aid used and consequently reduces the amount of unwanted reaction byproducts that are left in the material as scattering sites. The even distribution of sintering aid also can allow densification under less harsh conditions than traditionally used. The traditional conditions tend to accelerate the formation of reaction byproducts due to higher temperatures and higher time at the elevated temperatures. For example, even a reduction in densification temperature of 100° C. leads to a decrease in the amount of scattering sites.

The light absorbing regions are optionally reduced by one or two methods: increasing the amount of sintering aid and/or by baking the loose starting powder (LiF coated yttria) at about 600° C. in air for at least 1 hour. Optionally, the baking time is more than 6 hours. Concerning the baking temperature, baking at too high temperatures can cause exaggerated grain growth in the subsequently densified body, and lower temperatures may not completely remove the carbon containing species. The LiF also helps to remove transition metal and silicon through formation of volatile products. Although increasing the amount of sintering aid may be effective in reducing the amount of carbon and other species, it may be counter productive in that it increases the amount of scattering sites due to trapping of excess LiF which might be difficult to remove later from the densified body. LiF that is not removed also results in scattering sites.

A ceramic is optionally made from particles comprising a yttria core and a fluoride salt coating. In one embodiment, these particles are optionally made from a column-based drying process. A slurry is made by mixing yttria cores with a dissolved fluoride salt. The yttria cores should not dissolve in the solvent. Suitable sizes or diameters for the core are in a range, for example, from about 10 nm to about 100 µm. For example, the diameter of the core is 10 nm, 100 nm, 30 µm, or 100 µm. The cores are optionally approximately spherical particles and agglomerates. Suitable salts include, for example, lithium fluoride and aluminum fluoride. Care must be taken to ensure that the fluoride salt is completely dissolved and does not reform (or precipitate) until the coating (e.g. spraying) step. Premature contact between a precipitated fluoride salt and the yttria results in an inhomogeneous region that cause scattering in the final product.

The slurry is sprayed into a drying column. The mixing occurs as a separate step before spraying the slurry into the column. Alternatively, the mixing and spraying occurs simultaneously as when both components are individually sprayed simultaneously into the column. Other ingredients are optionally also present. One non-limiting example is when the components are sprayed separately, the cores are optionally mixed with a liquid that optionally immediately evaporates upon entering the column or otherwise does not significantly affect the process.

The slurry enters the column as an aerosol under thermal conditions that avoid boiling the solvent. As used in this context, "boiling" includes a temperature above the boiling point as well as conditions that cause rapid and significant evaporation of the solvent so that forming a coating of salt on the cores is prevented. The aerosol optionally enters the column at room temperature. Slightly elevated temperatures are alternatively used. An ultrasonic spray head is optionally used to spray the slurry into the drying column.

After spraying, the aerosol moves through the column, or falls down the column if it is vertically disposed. As the aerosol moves, the thermal conditions in the column evaporate the solvent. The term "aerosol" includes the material both before and after any evaporation of solvent. This evaporation results in forming a coating of the fluoride salt on the cores. The thermal conditions substantially avoid spalling. Spalling is when the outer portion of a liquid coating of solution first dries to form a crust around the still liquid inner portion of the coating. When solvent later evaporates from the inner portion, the gaseous expansion optionally blows off the crust, creating an incompletely coated particle. In some embodiments, the column has a temperature gradient, such that the temperature of the column increases from about 200° C. to about 500° C. as the aerosol travels through the column. This is optionally a linear increase in temperature, however other types of gradients, including multiple gradients, are optionally used. Higher temperatures or rapid increases in temperature may cause spalling.

Alternatively, the coating of the fluoride salt on the yttria optionally takes place without a spray column. In this case, the chemistry of the solution is modified in a reaction vessel to enable the fluoride coating material to deposit (e.g. precipitate) on the yttria powder particles so that typically no two yttria surfaces on adjacent particles are in direct contact with each other. Specifically, they are separated by the fluoride salt coating.

The process results in a particle comprising a yttria core and a fluoride salt coating on the core. The coating thickness is optionally between 1 nm and 500 µm. For example, the coating thickness is 1 nm, 10 nm, 100 µm, 200 µm, or 500 µm.

The LiF coated spinel particles or agglomerates optionally greatly reduce the densification process requirements to achieve highly dense and uniform shapes of hard to sinter materials. The coated yttria particles are optionally heat treated after fabrication in different environments such as air, oxygen, and/or halide atmosphere to remove any unwanted impurities.

The ceramic is optionally made from a plurality of the coated particles. Initially, the particles are optionally heated in an oxidizing atmosphere, such as air, to a temperature of about 400° C. to about 750° C., or for example, about 550° C. to about 650° C. This heating optionally makes the particles substantially free of carbon-containing species, such as hydrocarbons, and/or water. The carbon, silicon, and transition metal contents are optionally all be below 50 ppm.

The ceramic is then made from the previously heated particles by sintering the particles to form a solid ceramic. The fluoride salt optionally acts as a sintering agent. As used herein, the term "ceramic" refers to a ceramic material in any form, including, for example, a powder, a solid mass, a powder or solid mass mixed with other materials in a homogeneous or composite system, or combinations thereof. The term "solid ceramic" refers to an entire solid article that comprises the ceramic. Sintering is defined as the act of consolidating powder into a dense shape. The powder being sintered must additionally not melt to a great extent, though some melting of second-phases in the powder, or surface melting is allowed under this definition. If the material melts, the process is referred to as fusion casting. The ceramic is optionally made by the method described above or by other methods. The ceramic comprises at least about 90% yttria. For example, the ceramic is 95% or 99% yttria. The ceramic, for example, has desirable optical properties. For example, in an embodiment of the invention, the ceramic has a bulk scattering and absorption loss of less than about 1/cm at any wavelength in the range of about 0.3 to about 7.0 µm. The bulk loss (or in line loss) is not the total loss. A certain amount of light is lost to reflection. Yttria inherently has a reflection loss of about 17% from two faces. The bulk loss is relative to the light that is not reflected and is equal to $-\ln(T/T_o)/L$, where $T/T_o$ is the ratio of transmitted light to total light incident on the sample and L is the path length. Although the loss is optionally more than 1/cm in some portions of that wavelength range, there is at least one wavelength where the loss is less than 1/cm. The loss also is optionally less than 0.2/cm at any wavelength in the range of about 0.5 to about 6.0 µm.

There is optionally also a maximum loss across an entire range of wavelengths. For example, the loss is optionally less than about 1/cm for the entire range of 0.3 to 7.0 µm or the visible spectrum, or 0.2/cm for the entire range of 0.5 to 6.0 µm or the visible spectrum. Any combination of these ranges and losses is also acceptable.

A solid ceramic comprising the ceramic optionally also has the same optical properties. The solid ceramic is optionally pure ceramic and has the above properties through the entire solid body. The solid ceramic optionally also includes imperfections, impurities, or occlusions such that only at least about 80% of the solid ceramic exhibits such properties. For example, 95%, or 99% of the solid ceramic exhibits the properties. Such portion is optionally distributed throughout the solid ceramic with any degree of homogeneity or heterogeneity. The remaining portion of the solid ceramic optionally has unrelated optical properties. The solid ceramic optionally has an average grain size in the range of about 1 µm to about 1000 µm. For example, the solid ceramic has an average grain size in the range of between about 20 µm and about 300 µm. The process optionally results in these relatively large grain sizes without creating excess imperfections on the surface of the larger grains which optionally contribute to the desirable optical properties.

The low scattering, low absorption yttria optionally allows the use of yttria in systems where enhanced light transmission is required. It is optionally useful in the area of transparent ceramic windows and domes, consumer electronics, lighting, transparent ceramics, electronics, refractory structural ceramics and high power lasers.

The rare earth doped yttria powder coated with fluoride salt is similar to the undoped yttria powder, except that the rare earth ion demonstrates fluorescence emission on pumping with a laser. The fluoride salt coating does not change the fluorescence emission lifetime of the rare earth ion compared with the uncoated rare earth doped yttria powder. For example, the lifetime of the 1 um emission for 10 mol % Yb doped yttria powder is 0.8 ms. Similar powder with the LiF coating exhibits the same lifetime. Other rare earth ion dopants also exhibit fluorescence, characteristic of the ion, and this fluorescence is unaffected by the presence of the fluoride salt coating. In other words, the rare earth ions are not impacted by the presence of the sintering aid (fluoride salt) coating.

Having described the invention, the following examples are given to illustrate specific applications of the invention. These specific examples are not intended to limit the scope of the invention described in this application.

EXAMPLE 1

Comparative

Traditional method Yb doped-yttria was made using a traditional process where 1.0 wt % LiF and 1 µm Yb-doped yttria particles (World Labo Nagoya, Japan) were mechanically mixed and then densified by hot pressing: ramp 20° C./min to 950° C., hold 30 min., ramp 20° C./min to 1200° C., hold 30 min and ramp 20° C./min to 1650° C., hold 2 hours under vacuum and at 8000 psi pressure.

Loss plot (FIG. 1) shows loss of greater than 0.2/cm. The loss varied with position on the sample surface and was random, limiting usefulness of sample.

EXAMPLE 2

LiF-coated Yb-doped yttria particle-LiF was dissolved in water (0.036 g LiF in 400 mL DI water) to make the stock solution. 600 mL of the stock solution was further diluted with 600 mL ethyl alcohol and then mixed with 15 g of Yb-doped yttria particles, and ultra-sonically sprayed. The column was 60 inches tall. The bottom of the ultrasonic spray head was about 6 inches from the top of the column. A 12 inch tall heater was wrapped around the column, centered at 27 inches from the top of the column. A second such heater was centered 47 inches from the top of the column. The heaters were set at 415° C. at the top heater and 430° C. at the bottom heater. Inside the column the temperatures were approximately about 30° C. at the bottom of the ultrasonic spray head, 150° C. at the center of the top heater and 270° C. at the center of the bottom heater, respectively. The LiF was specifically prevented from coming out of solution until it was falling through the spray-drying column. As the solvents evaporated while falling through the drying column, the LiF reached saturation and deposited on the yttria particle. If the spray droplet were dried too fast the deposited LiF would spall off the particles. If the hot zone were not sufficiently hot the LiF would remain wet and the particles would stick together. The particles were collected in a cyclone separator, then baked at 600° C. for 12 hours in air.

The rare earth doped yttria powder coated with fluoride salt is similar to undoped yttria powder, except that the rare earth ion demonstrates fluorescence emission on pumping with a laser. The fluoride salt coating does not change the fluorescence emission lifetime of the rare earth ion compared with the uncoated rare earth doped yttria powder. For example, the lifetime of the 1 um emission for 10 mol % Yb doped yttria powder is 0.8 ms. Similar powder with the LiF coating exhibits the same lifetime. Other rare earth ion dopants also exhibit fluorescence, characteristic of the ion, and this fluorescence is unaffected by the presence of the fluoride salt coating. In other words, the rare earth ions are not impacted by the presence of the sintering aid (fluoride salt) coating.

EXAMPLE 3

Pressing into a transparent shape—The coated powder from Example 2 was placed in a flexible graphite-lined graphite hot press die. An example of flexible graphite consistent with the instant invention is Grafoil® flexible graphite by Sealing Devices, Inc. The die was placed in an argon/vacuum atmosphere hot press. Minimal pressure was applied until the powder started to densify at approximately 1100° C. and was then stepped up to or above 3000 psi when a temperature at or above 1450° C. was attained. The heating schedule was a 20° C./min ramp to 950° C., a 30 minute hold to equilibrate the temperature profile, a 20° C./min ramp to 1200° C., a 30 min hold to allow the now vaporized LiF to leave the hot press die, a 20° C./min ramp to 1650° C., and a 2 hour hold to fully densify the powder into a transparent shape. The heating elements were turned off to allow natural cooling of the hot press and the hydraulic motor was turned off to allow the pressure to bleed off. The use of the LiF coating allowed the hot pressing of the Yb-doped yttria particles into a shape that is above 98% bulk transmission. Optical properties were determined after polishing.

EXAMPLE 4

Figure 2:
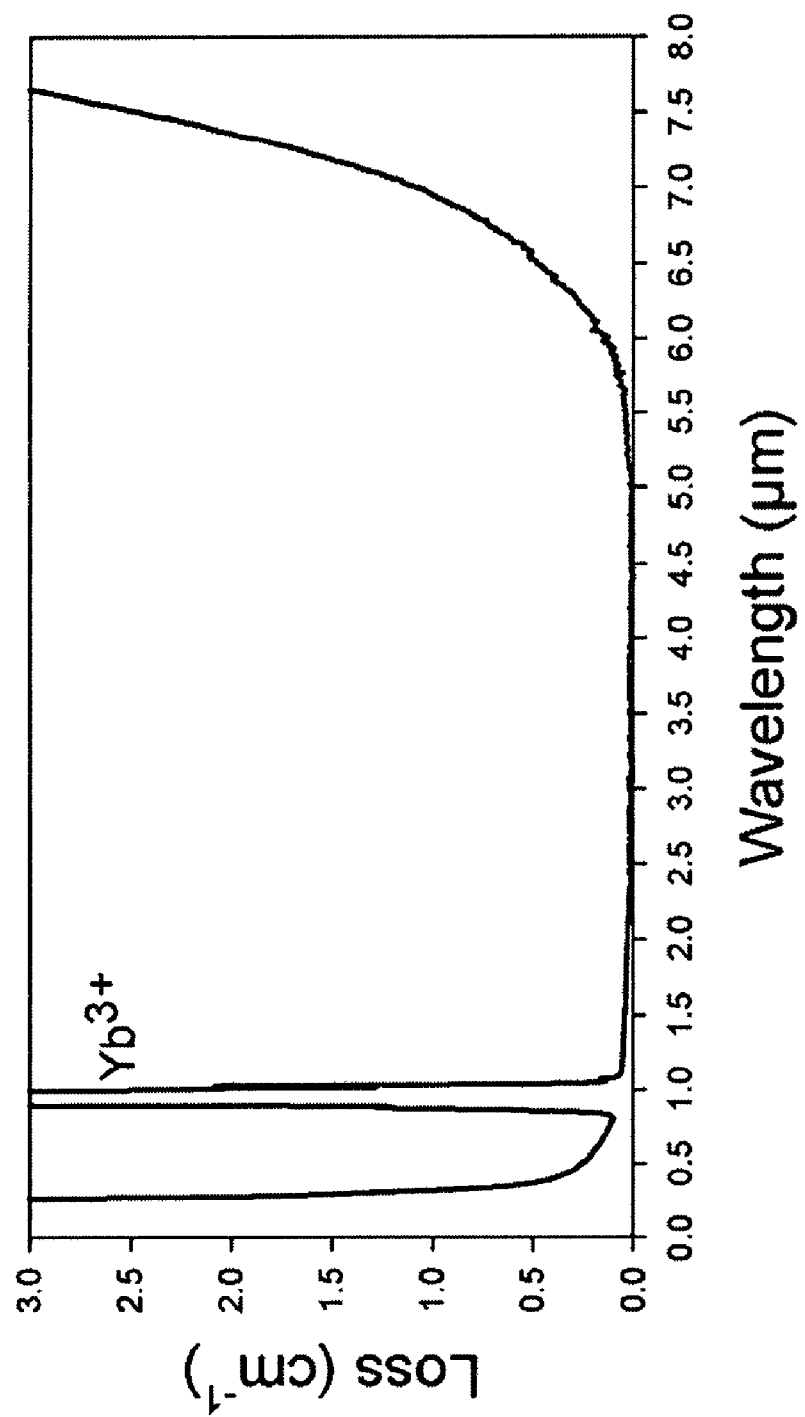

Solid ceramic—This example shows the process for making Yb-doped yttria using the LiF coated Yb-doped yttria particles and heat treating them in air prior to densification at 600° C. for 12-18 hours. Hot pressing schedule is the same as in Example 3. Impurity concentrations of carbon, silicon, and transition metal ions were all below 50 ppm, respectively, over the entire sample without any specific regions exceeding these values. Loss plot (FIG. 2) shows loss of <0.2/cm. The loss was consistently low all over the sample surface. The process produced a Yb-doped yttria product with high and uniform transparency over large area (e.g., ~95% of the total surface area).

Obviously, many modifications and variations of the present invention are possible in light of the above teachings. It is therefore to be understood that the claimed invention may be practiced otherwise than as specifically described.

What is claimed is:

1. A particle comprising:
    a first yttria core; and
    a fluoride salt coating on the first yttria core, wherein said coating is sufficiently continuous to prevent a plurality of sites where a second yttria core come into contact with the first yttria core.

2. The particle according to claim 1, wherein the particle has been heated in an oxidizing atmosphere to a temperature in the range of about 400° C. to about 750° C.

3. The particle according to claim 1, wherein the particle is substantially free of at least one of carbon-containing species and water.

4. The particle according to claim 1, wherein the fluoride salt is lithium fluoride.

5. The particle according to claim 1, wherein the fluoride salt is aluminum fluoride.

6. The particle according to claim 1, wherein the particle is made by a process comprising:
    mixing the yttria core with a solution of the fluoride salt in a solvent to form a slurry; and
    spraying the slurry into a drying column;
    wherein the slurry enters the drying column as an aerosol under thermal conditions that avoid boiling the solvent;
    wherein thermal conditions in the drying column evaporate the solvent as the aerosol moves through the drying column to form a coating of the fluoride salt on the yttria core while substantially avoiding spalling.

7. The particle according to claim 1, wherein the yttria core has a diameter of from about 10 nanometers to about 100 microns; and wherein the coating has a thickness of from about 1 nanometer to about 500 microns.

8. The particle according to claim 1, wherein the yttria core has a diameter of from about 100 nanometers to about 30 microns; and wherein the coating has a thickness of from about 10 nanometers to about 200 microns.

9. The particle according to claim 1, wherein the particle is made by a process comprising: heating the particle in an oxidizing atmosphere to a temperature in the range of about 550° C. to about 650° C. to such that the resulting particle is substantially free of carbon-containing species.

* * * * *